(12) United States Patent
Zhang et al.

(10) Patent No.: US 12,148,074 B2
(45) Date of Patent: Nov. 19, 2024

(54) OBJECT-TO-OBJECT HARMONIZATION FOR DIGITAL IMAGES

(71) Applicant: Adobe Inc., San Jose, CA (US)

(72) Inventors: He Zhang, San Jose, CA (US); Jeya Maria Jose Valanarasu, Baltimore, MD (US); Jianming Zhang, Campbell, CA (US); Jose Ignacio Echevarria Vallespi, South San Francisco, CA (US); Kalyan Sunkavalli, San Jose, CA (US); Yilin Wang, San Jose, CA (US); Yinglan Ma, Mountain View, CA (US); Zhe Lin, Fremont, CA (US); Zijun Wei, San Jose, CA (US)

(73) Assignee: Adobe Inc., San Jose, CA (US)

( * ) Notice: Subject to any disclaimer, the term of this patent is extended or adjusted under 35 U.S.C. 154(b) by 468 days.

(21) Appl. No.: 17/503,671

(22) Filed: Oct. 18, 2021

(65) Prior Publication Data
US 2023/0122623 A1    Apr. 20, 2023

(51) Int. Cl.
| G06T 11/60 | (2006.01) |
| G06F 3/04842 | (2022.01) |
| G06F 3/04845 | (2022.01) |
| G06N 3/08 | (2023.01) |
| G06V 10/40 | (2022.01) |
| G06V 10/75 | (2022.01) |

(52) U.S. Cl.
CPC .......... G06T 11/60 (2013.01); G06F 3/04842 (2013.01); G06F 3/04845 (2013.01); G06N 3/08 (2013.01); G06V 10/40 (2022.01); G06V 10/751 (2022.01)

(58) Field of Classification Search
None
See application file for complete search history.

(56) References Cited

U.S. PATENT DOCUMENTS

| 2018/0260668 A1* | 9/2018 | Shen | G06V 10/82 |
| 2019/0244329 A1* | 8/2019 | Li | G06N 3/045 |
| 2019/0325628 A1* | 10/2019 | Dubey | G06T 11/001 |
| 2021/0319629 A1* | 10/2021 | Huang | G06T 19/20 |
| 2021/0358164 A1* | 11/2021 | Liu | G06N 3/088 |
| 2022/0198721 A1* | 6/2022 | Melnik | G06T 11/00 |

* cited by examiner

*Primary Examiner* — Leon Viet Q Nguyen
(74) *Attorney, Agent, or Firm* — Keller Preece PLLC

(57) ABSTRACT

The present disclosure relates to systems, methods, and non-transitory computer readable media for accurately and flexibly generating harmonized digital images utilizing an object-to-object harmonization neural network. For example, the disclosed systems implement, and learn parameters for, an object-to-object harmonization neural network to combine a style code from a reference object with features extracted from a target object. Indeed, the disclosed systems extract a style code from a reference object utilizing a style encoder neural network. In addition, the disclosed systems generate a harmonized target object by applying the style code of the reference object to a target object utilizing an object-to-object harmonization neural network.

20 Claims, 12 Drawing Sheets

900

Extracting A Style Code From A Reference Object 902

Determining A Target Object To Harmonize 904

Generating A Harmonized Target Object From The Style Code 906

OBJECT-TO-OBJECT HARMONIZATION FOR DIGITAL IMAGES

BACKGROUND

Compositing digital images has become a common operation in digital image editing. To make a composite digital image appear realistic, some existing digital image editing systems utilize a technique called image harmonization to adjust the foreground with the background for a stylistic match. Recent developments in software and hardware platforms have led to conventional systems that composite digital images by considering entire image backgrounds for guiding harmonization with foreground pixels. Despite the advancements in existing approaches for compositing digital images, conventional digital image editing systems continue to experience a number of drawbacks or disadvantages, particularly with regard to accuracy and flexibility.

SUMMARY

One or more embodiments described herein provide benefits and solve one or more of the foregoing or other problems in the art with systems, methods, and non-transitory computer readable media that accurately and flexibly generate harmonized digital images utilizing an object-to-object harmonization neural network. Using the techniques and methods described herein, the disclosed systems improve the accuracy of image compositing by facilitating object-specific harmonization to match style (e.g., color and other factors) between individual objects (as opposed to entire digital images). Specifically, the disclosed systems implement, and learn parameters for, an object-to-object harmonization neural network to combine a style code from a reference object with features extracted from a target object. The design of the object-to-object harmonization neural network allows for modifying features of an individual object (e.g., a target object) within a digital image as guided by a style code extracted from another object (e.g., a reference object) without affecting other pixels of a digital image. By utilizing the object-to-object harmonization neural network, the disclosed systems accurately and flexibly generate harmonized digital images where a target object is modified to reflect a style of a reference object.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
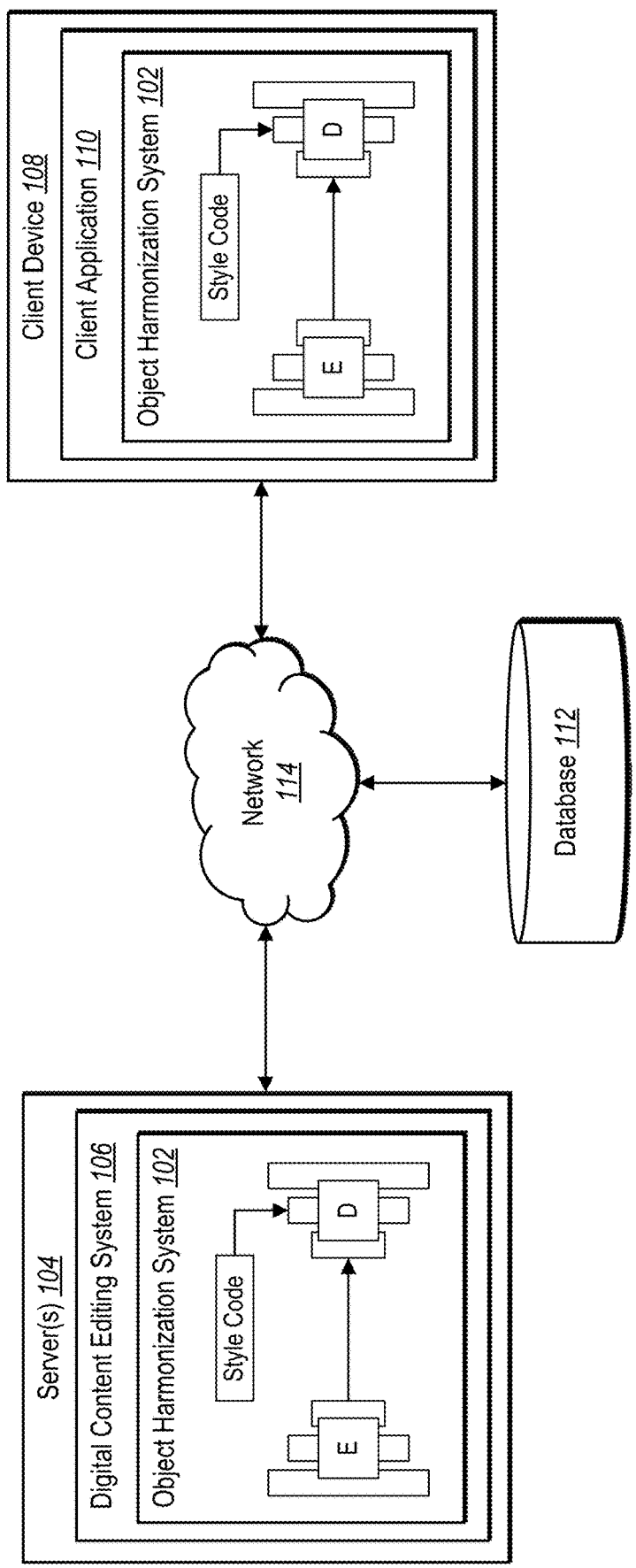
FIG. 1 illustrates an example system environment in which an object harmonization system operates in accordance with one or more embodiments.

One or more embodiments described herein include an object harmonization system that accurately and flexibly generates harmonized digital images utilizing an object-to-object harmonization neural network. In practical settings, a composite digital image likely contains objects that have different lighting conditions from each other and/or from background pixels of the digital image. To harmonize the lighting conditions of one object to another within a single digital image or when adding a new object to a digital image (e.g., to match the lighting conditions of a particular object within the digital image), in some embodiments, the object harmonization system utilizes an object-to-object harmonization neural network. For example, the object harmonization system extracts a style code from a reference object (e.g., an object within the digital image) utilizing a style encoder neural network and further utilizes an object-to-object harmonization neural network to augment features of a target object (e.g., an object to stylistically harmonize with the reference object) based on the extracted style code. In some cases, the object harmonization system utilizes a special case of an object-to-object harmonization neural network for portrait-to-portrait harmonization, where the harmonized objects are portraits or faces of individuals. In some embodiments, the object harmonization system further learns parameters for the object-to-object harmonization neural network via a multi-stage learning or tuning process.

As just mentioned, in one or more embodiments the object harmonization system stylistically harmonizes a target object to a reference object. For example, the object harmonization system generates a harmonized target object depicted or portrayed in a style that matches a style of a reference object. In some cases, the object harmonization system generates the harmonized target object by modifying or augmenting features extracted from a target object utilizing an object-to-object harmonization neural network. For instance, the object harmonization system augments the features as guided by a style code that represents the style of the reference object.

In one or more embodiments, the object harmonization system extracts the style code from the reference object by utilizing a style encoder neural network. For example, the object harmonization system utilizes a style encoder neural network to extract or encode features from a reference object into a style code that represents stylistic attributes of the reference object, such as color, a saturation, a brightness, and a hue. In certain cases, the object harmonization system further utilizes an object-to-object harmonization neural network to extract features from a target object and to modify the extracted features utilizing the style code of the reference object. By modifying the extracted features utilizing the style code, the object harmonization system generates a harmonized target object having a style corresponding to the style code of the reference object. Thus, the object harmonization system generates a harmonized target object that is stylistically harmonized with the reference object, matching lighting conditions to reflect similar color, saturation, and brightness and hue.

In some embodiments, the object harmonization system extracts features of a target object by utilizing one or more encoder layers of an object-to-object harmonization neural network. In addition, in some cases, the object harmonization system generates modified features from the extracted features by applying a style code extracted from a reference object (e.g., by a style encoder neural network) to the extracted features of the target object. For instance, the object harmonization system generates the modified features utilizing one or more decoder layers of the object-to-object harmonization neural network. Further, in one or more embodiments, the object harmonization system generates a harmonized target object from the modified features.

In certain embodiments, the object harmonization system identifies a reference object based on user interaction. For example, the object harmonization system receives a user interaction selected or otherwise indicating a reference object within a digital image. In some cases, the object harmonization system isolates the reference object by masking other pixels of the digital image not depicting the reference object. In the same or other embodiments, the object harmonization system identifies a target object based on user interaction. For instance, the object harmonization system receives a user interaction selecting or otherwise indicating a target object. In some embodiments, the object harmonization system receives a selection of a target object from the same digital image as the reference object or from a different digital image.

As suggested, in one or more embodiments, the object harmonization system implements a specialized form of object-to-object harmonization called portrait-to-portrait harmonization. In these or other cases, the object harmonization system generates a harmonized target portrait from a target portrait. For instance, the object harmonization system extracts a style code from a reference portrait utilizing a style encoder neural network. In addition, in some cases, the object harmonization system generates a harmonized target portrait depicted in a style corresponding to the extracted style code. For example, the object harmonization system modifies features extracted from a target portrait utilizing the extracted style code to match the style of the reference portrait.

As mentioned above, in certain embodiments, the object harmonization system learns parameters for an object-to-object harmonization neural network. For example, the object harmonization system implements a two-stage training process to learn parameters for the object-to-object harmonization neural network and for a style encoder neural network. In some cases, the object harmonization system learns a set of parameters for the object-to-object harmonization neural network utilizing a first stage of background harmonization training. In certain embodiments, the object harmonization system further fine tunes the set of parameters utilizing a second stage of object-to-object harmonization training. Additional regarding the training process and its individual stages is provided below with reference to the figures.

As mentioned, conventional digital image editing systems exhibit a number of drawbacks, particularly in accuracy and flexibility. To illustrate, many conventional image editing systems inflexibly generate composite digital images. To elaborate, existing systems are often rigidly limited to performing image harmonization between entire digital images. For example, some prior systems harmonize style or appearance between a background digital image and a foreground digital image (e.g., to modify the foreground digital image to match the style of the background digital image). Even for systems that are able to harmonize an individual object to a background digital image, these conventional systems are nevertheless rigidly limited to guiding the harmonization with the entire background digital image. Indeed, existing systems are generally incapable of adapting harmonization differently for different reference objects even within the same digital image.

Due at least in part to their inflexibility, some conventional digital image editing systems are also inaccurate. For instance, some conventional systems generate composite digital images that inaccurately reflect lighting conditions or other style attributes for specific reference objects. To elaborate, existing systems generally harmonize a target object with an entire background digital image so that the target object will reflect the same style of the background. Consequently, many prior systems either ignore or cannot account for any differences in lighting conditions at different locations (e.g., where different reference objects are placed) within the background digital image. Instead, conventional systems match the style of a target object to the entire background digital in a generalized, broad strokes approach.

As suggested above, embodiments of the object harmonization system provides several improvements or advantages over conventional digital image editing systems. For example, embodiments of the object harmonization system provide improved flexibility over conventional systems. Compared to conventional systems that are rigidly fixed to generating composite digital images harmonized in relation to entire backgrounds, the object harmonization system flexibly adapts to an object-specific scale. For instance, embodiments of the object harmonization system utilize a unique neural network called an object-to-object harmonization neural network to stylistically harmonize target objects to specific reference objects. In some cases, the object harmonization system generates multiple harmonized target objects within a single digital image, where each harmonized target object reflects lighting conditions (or other style attributes) of a different reference object from the digital image.

As a result of its improved flexibility, embodiments of the object harmonization system further improve accuracy over conventional digital image editing systems. While many conventional systems harmonize a target object to a background digital image as a whole, the object harmonization system utilizes an object-to-object harmonization neural network to harmonize a target object to a particular reference object. Thus, unlike conventional systems that generate unrealistic and/or unconvincing harmonized objects that clash with certain portions of the background, the object harmonization system more precisely harmonizes target objects to reflect lighting conditions or styles of particular reference objects (at particular locations) within a digital image.

Additional detail regarding the object harmonization system will now be provided with reference to the figures. For example, FIG. 1 illustrates a schematic diagram of an example system environment for implementing an object harmonization system 102 in accordance with one or more embodiments. An overview of the object harmonization system 102 is described in relation to FIG. 1. Thereafter, a more detailed description of the components and processes of the object harmonization system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 10.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single client device 108, in some embodiments the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, generate a harmonized target object by utilizing an object-to-object harmonization neural network. In some cases, the client device 108 receives user input via the client application 110 to indicate a reference object (e.g., by defining a mask to select the reference from a digital image) and/or a target object. Thus, the object harmonization system 102 on the server(s) 104 receives information or instructions to generate a harmonized target object from a target object, as guided by a style of a reference object, stored within the database 112.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital image editing interface. In some cases, a user interacts with the client application 110 to provide user input to perform operations as mentioned above, such as generating a harmonized target object or a harmonized digital image by modifying a target object to stylistically harmonize with a reference object. As used herein, harmonizing objects can refer to adjusting the appearance of one object to match or align with the appearance of another object.

As illustrated in FIG. 1, the environment includes the server(s) 104. The server(s) 104 generates, tracks, stores, processes, receives, and transmits electronic data, such as digital images and an object-to-object harmonization neural network (including the illustrated encoder layers "E" and decoder layers "D"). For example, the server(s) 104 receives data from the client device 108 in the form of an indication of a user interaction to generate a harmonized target object.

In addition, the server(s) 104 transmits data to the client device 108 to provide a harmonized target object (e.g., for display within a harmonized digital image including a reference object and the newly added harmonized target object). Indeed, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 comprises a digital image server, a content server, an application server, a communication server, a web-hosting server, a multidimensional server, or a machine learning server.

As further shown in FIG. 1, the server(s) 104 also includes the object harmonization system 102 as part of a digital content editing system 106. The digital content editing system 106 communicates with the client device 108 to perform various functions associated with the client application 110 such as storing and managing a repository of digital images, generating harmonized target objects and/or harmonized digital images, and providing harmonized target objects and/or harmonized digital images for display. For example, the object harmonization system 102 communicates with the database 112 to access digital images, reference objects, target objects, and an object-to-object harmonization neural network used to modify the digital images and/or the target objects. Indeed, as further shown in FIG. 1, the environment includes a database 112. In particular, the database 112 stores information such as digital images, a style encoder neural network, and an object-to-object harmonization neural network.

In one or more embodiments, the server(s) 104 includes all, or a portion of, the object harmonization system 102. For example, the object harmonization system 102 operates on the server(s) to generate harmonized target objects utilizing an object-to-object harmonization neural network. In some cases, the object harmonization system 102 utilizes, locally on the server(s) 104 or from another network location (e.g., the database 112), an object-to-object harmonization neural network and a style encoder neural network to generate harmonized target objects from style codes extracted from reference objects.

Although FIG. 1 illustrates a particular arrangement of the environment, in some embodiments, the environment has a different arrangement of components and/or may have a different number or set of components altogether. For instance, in some embodiments, the object harmonization system 102 is implemented by (e.g., located entirely or in part on) the client device 108 and/or a third-party device. In addition, in one or more embodiments, the client device 108 communicates directly with the object harmonization system 102, bypassing the network 114. Further, in some embodiments, the database 112 is located external to the server(s) 104 (e.g., in communication via the network 114) or located on the server(s) 104 and/or on the client device 108.

In particular, in some implementations, the object harmonization system 102 on the server(s) 104 supports the object harmonization system 102 on the client device 108. For instance, the object harmonization system 102 on the server(s) 104 learns parameters for the object-to-object harmonization neural network. The object harmonization system 102 then, via the server(s) 104, provides the object-to-object harmonization neural network to the client device 108. In other words, the client device 108 obtains (e.g., downloads) the object-to-object harmonization neural network with the learned parameters from the server(s) 104. Once downloaded, the object harmonization system 102 on the client device 108 is able to utilize the object-to-object harmonization neural network to generate harmonized digital image independent from the server(s) 104.

In alternative implementations, the object harmonization system 102 on the server(s) 104 includes a web hosting application that allows the client device 108 to interact with content and services hosted on the server(s) 104. To illustrate, in one or more implementations, the client device 108 accesses a web page supported by the server(s) 104. The client device 108 provides a digital image or one or more digital objects to the server(s) 104, and, in response, the object harmonization system 102 on the server(s) 104 performs object-to-object harmonization utilizing the object-to-object harmonization neural network. The server(s) 104 then provides the modified digital image or harmonized objects to the client device 108 for display or further editing.

Figure 2:
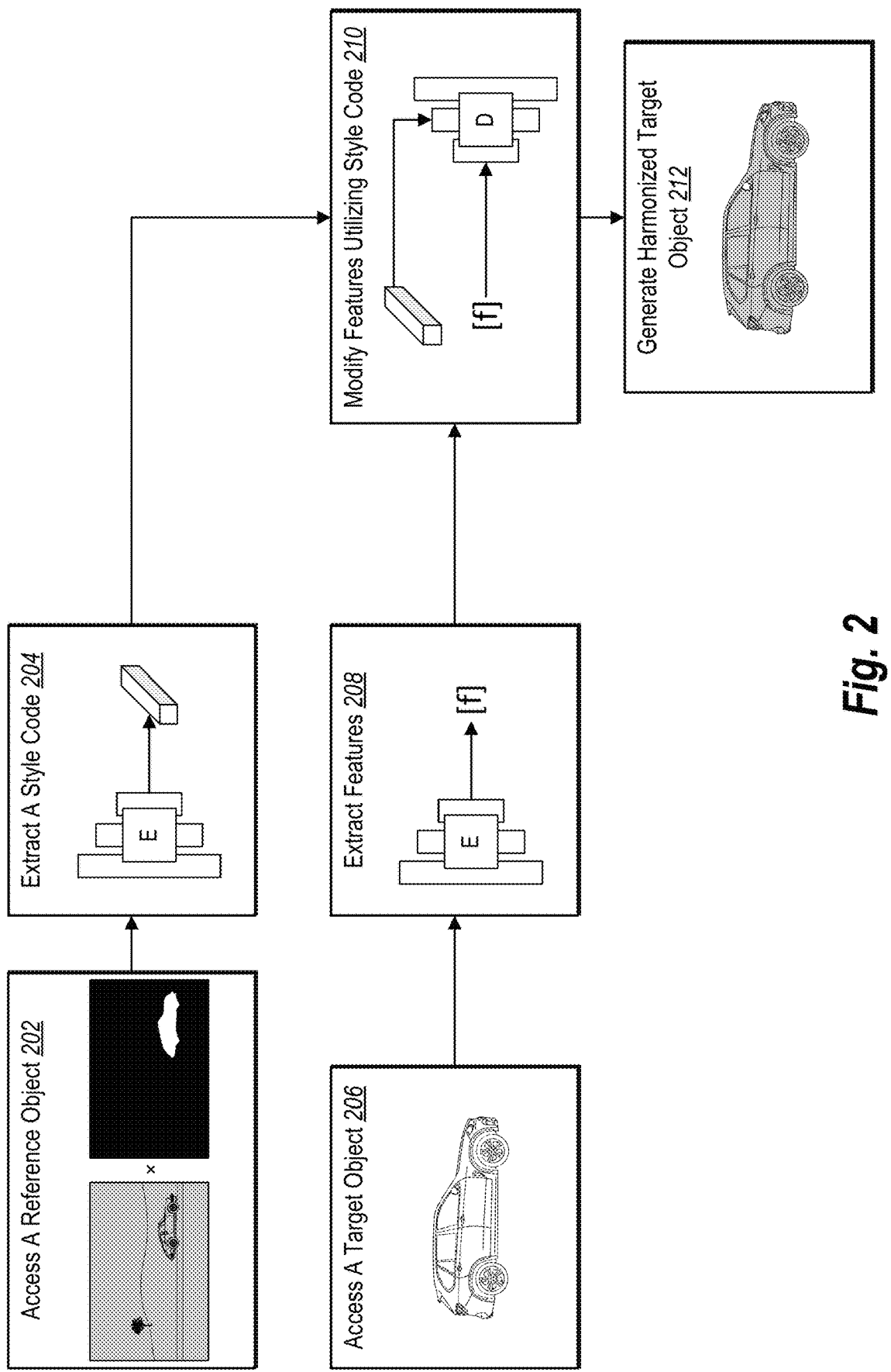
FIG. 2 illustrates an overview of generating a harmonized target object utilizing an object-to-object harmonization neural network in accordance with one or more embodiments.

As mentioned, in one or more embodiments, the object harmonization system 102 generates a harmonized target object from a reference object and a target object. In particular, the object harmonization system 102 generates a harmonized target object that reflects lighting conditions, an appearance, and/or a style of a reference object. FIG. 2 illustrates an overview of a process for generating a harmonized target object in accordance with one or more embodiments. FIG. 2 provides a high-level description of the acts involved in generating a harmonized target object. Additional detail regarding the specific acts is provided below with reference to subsequent figures.

As illustrated in FIG. 2, the object harmonization system 102 performs an act 202 to access a reference object. A reference object can refer to a group of pixels depicting a particular object such as a person or a thing that is used as a reference, or as a basis, for stylistic harmonization or style matching. In some cases, the object harmonization system 102 accesses or receives a reference object based on user interaction indicating the reference from a digital image. For example, the object harmonization system receives a user interaction selecting, outlining, or lassoing a reference object from a digital image. As shown, the object harmonization system 102 isolates the reference object from a digital image by masking pixels of the digital image not depicting the reference object (e.g., where the blacked out pixels are masked out so only the white pixels are considered as the reference object).

As further illustrated in FIG. 2, the object harmonization system 102 performs an act 204 to extract a style code. In particular, the object harmonization system 102 extracts a style code from the reference object, or from the non-masked pixels of the digital image. For example, the object harmonization system 102 utilizes a style encoder neural network to extract a style code from the pixels of the reference object. As used herein, a neural network can refer to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., determinations of digital image classes or labels) based on a plurality of inputs provided to the neural network. In some cases, a neural network refers to an algorithm (or set of algorithms) that implements deep learning techniques to model high-level abstractions in data.

As mentioned, the object harmonization system 102 utilizes a style encoder neural network to extract a style code from a reference object. As used herein, a style encoder neural network can refer to a neural network that extracts or encodes latent features into a style code that reflects or represents a style or an appearance of an object. In some cases, a style encoder neural network includes a series of partial convolutional layers for encoding a style of an object. Relatedly, a style code can refer to a set of latent features encoded or extracted from pixels to represent a style of a reference object. For example, a style code is a one-dimensional code that represents a style indicated by an appearance or by lighting conditions of an object, including a color, a saturation, a brightness, and/or a hue of the object. Example style codes include a background style code that represents a style of an entire background of a digital image and an object style code that represents a style of a particular object (e.g., a reference object or a target object).

As further illustrated in FIG. 2, the object harmonization system 102 performs an act 206 to access a target object. More specifically, the object harmonization system 102 performs the act 206 to access or receive a target object via user interaction from the client device 108. As used herein, a target object can refer to an object or a set of pixels designated for harmonizing (or adjusting its appearance) to align with a reference object. For example, the object harmonization system 102 receives a user interaction to select a target object (e.g., from the database 112) or to upload a target object from the client device 108. As shown, the target object is a car of different make and model than the car of the reference object.

As shown, the object harmonization system 102 also performs an act 208 to extract features from the target object. To elaborate, the object harmonization system 102 utilizes one or more encoder layers of an object-to-object harmonization neural network to extract a set of latent features ("[f]") representing the target object. As used herein, an object-to-object harmonization neural network can refer to a neural network that includes encoder layers and decoder layers and that modifies features of a target object utilizing a style code to align the features more closely with the style code. Indeed, an object-to-object harmonization neural network stylistically harmonizes a target object with a reference object so that the target object has a similar style or appearance to the reference object.

As further illustrated in FIG. 2, the object harmonization system 102 performs an act 210 to modify the extracted features utilizing the style code. More specifically, the object harmonization system 102 modifies the features extracted from the target object (e.g., via the act 208) utilizing the style code extracted from the reference object (e.g., via the act 204). For example, the object harmonization system 102 utilizes the style code as a guide to modify the features of the target object. In some cases, the object harmonization system 102 utilizes one or more decoder layers of the object-to-object harmonization neural network to modify the extracted features with the style code. Indeed, the object harmonization system 102 utilizes decoder layers to decode the extracted features, where the decoding is modified or guided by the style code of the reference object.

In addition, the object harmonization system 102 performs an act 212 to generate a harmonized target object. Indeed, the object harmonization system 102 generates a harmonized target object from the modified features extracted from the initial target object. For instance, the object harmonization system 102 generates the harmonized target object utilizing decoder layers of the object-to-object harmonization neural network. As shown, the object harmonization system 102 generates a harmonized target object with the shape and structure of the initial target object but reflecting the style of the reference object (e.g., with the gray coloring).

Figure 3:
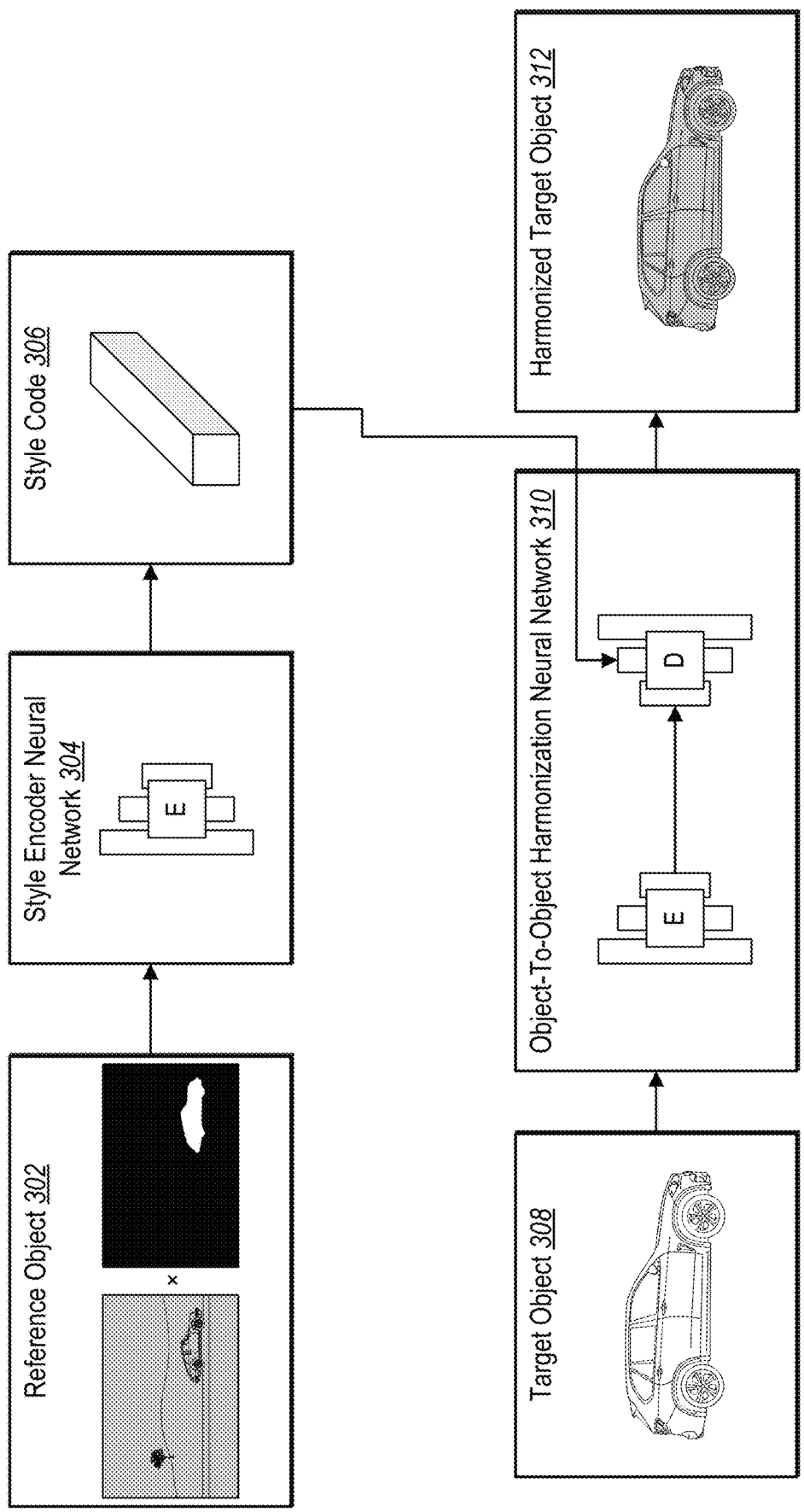
FIG. 3 illustrates additional details regarding generating a harmonized target object utilizing an object-to-object harmonization neural network in accordance with one or more embodiments.

As mentioned above, in some embodiments, the object harmonization system 102 generates a harmonized target object from a target object utilizing a style code extracted from a reference object. In particular, the object harmonization system 102 applies the extracted style code to features of a target object utilizing an object-to-object harmonization neural network. FIG. 3 illustrates a process for generating a harmonized target object by applying a style code utilizing an object-to-object harmonization neural network in accordance with one or more embodiments.

As illustrated in FIG. 3, the object harmonization system 102 identifies or determines a reference object 302. As mentioned, the object harmonization system 102 determines a reference object from a digital image by, for instance, masking out pixels of the digital image that do not depict the reference object. In some cases, the object harmonization system 102 determines the reference object based on a user interaction selecting or outlining the pixels of the digital image that constitute the reference object. Indeed, the object harmonization system 102 receives a selection of the reference object from the client device 108. As shown, the reference object 302 includes the pixels of the car that remain unmasked after the binary mask is applied to mask out the other pixels.

As further illustrated in FIG. 3, the object harmonization system 102 utilizes a style encoder neural network 304 to analyze or process the reference object 302. More specifically, the object harmonization system 102 utilizes the style encoder neural network 304 to process the pixels of the reference object and extract a style code 306. Indeed, the object harmonization system 102 extracts a style code 306 that includes a set of latent features representing a style of the reference object 302. For instance, the style code 306 includes latent features representing lighting conditions of the reference object 302 that affects its color, saturation, brightness, and hue.

Additionally, the object harmonization system 102 identifies or receives a target object 308. As mentioned above, the object harmonization system 102 receives a user interaction indicating the target object 308 from the client device 108. For instance, the object harmonization system 102 receives a user interaction to select the target object 308 from a digital image, from a database (e.g., the database 112), and/or as an upload via the client device 108. As shown, the target object 308 is a car with a different style and a different shape from the reference object 302.

As illustrated in FIG. 3, the object harmonization system 102 further utilizes an object-to-object harmonization neural network 310 to process or analyze the target object 308. To elaborate, the object harmonization system 102 extracts features from the target object 308. Specifically, the object harmonization system 102 extracts a set of latent features from the target object 308 utilizing one or more encoder layers of the object-to-object harmonization neural network 310.

In addition, the object harmonization system 102 passes the extracted or encoded features of the target object to decoder layers of the object-to-object harmonization neural network 310. In turn, the decoder layers decode the extracted features to generate an output in the form of a harmonized target object 312. To generate the harmonized target object 312, the object harmonization system 102 utilizes the style code 306 of the reference object 302 to guide the decoding of the features of the target object 308.

More specifically, the object harmonization system 102 passes the style code 306 to one or more adaptive instance norm ("AdaIN") layers in between residual blocks within the decoder of the object-to-object harmonization neural network 310, where the adaptive instance norm layers can help the algorithm leverage some low-level statistics from background pixels to apply to foreground pixels. The object-to-object harmonization neural network 310 thus modifies or augments the features of the target object 308 by applying the style code 306 to generate the harmonized target object 312 having a style corresponding to the style of the reference object 302.

In one or more embodiments, the object harmonization system 102 also (or alternatively) generates a harmonized digital image. For example, the object harmonization system 102 generates a harmonized digital image that includes a harmonized target object (e.g., the harmonized target object 312). In some cases, the object harmonization system 102 generates a harmonized digital image to include both a reference object (e.g., the reference object 302) and a harmonized target object (e.g., the harmonized target object 312) stylistically harmonized with the reference object. In these or other cases, the object harmonization system 102 generates a harmonized digital image that includes multiple harmonized target objects and/or multiple reference objects. For instance, the object harmonization system 102 extracts different style codes from different reference objects within a single digital image and applies the style codes to respective target objects to include within the digital image utilizing the object-to-object harmonization neural network 310. Thus, the object harmonization system 102 generates different harmonized target objects that each reflect styles or lighting conditions of different reference objects located at different positions within the same digital image.

In some embodiments, the object harmonization system 102 performs a step for generating, from the target object, a harmonized target object depicted in a style corresponding to the reference object. The above description of acts 204 and 208-212 of FIG. 2, including the more detailed descriptions in support of acts 204 and 208-212 provided in relation to FIG. 3, provide various embodiments and supporting acts and algorithms for performing a step for generating, from the target object, a harmonized target object depicted in a style corresponding to the reference object.

For example, in some embodiments, performing a step for generating, from the target object, a harmonized target object depicted in a style corresponding to the reference object includes extracting a style code from a reference object utilizing a style encoder neural network. In some embodiments, performing a step for generating, from the target object, a harmonized target object depicted in a style corresponding to the reference object also includes extracting features from a target object and modifying the extracted features by applying the style code of the reference object utilizing an object-to-object harmonization neural network.

Figure 4:
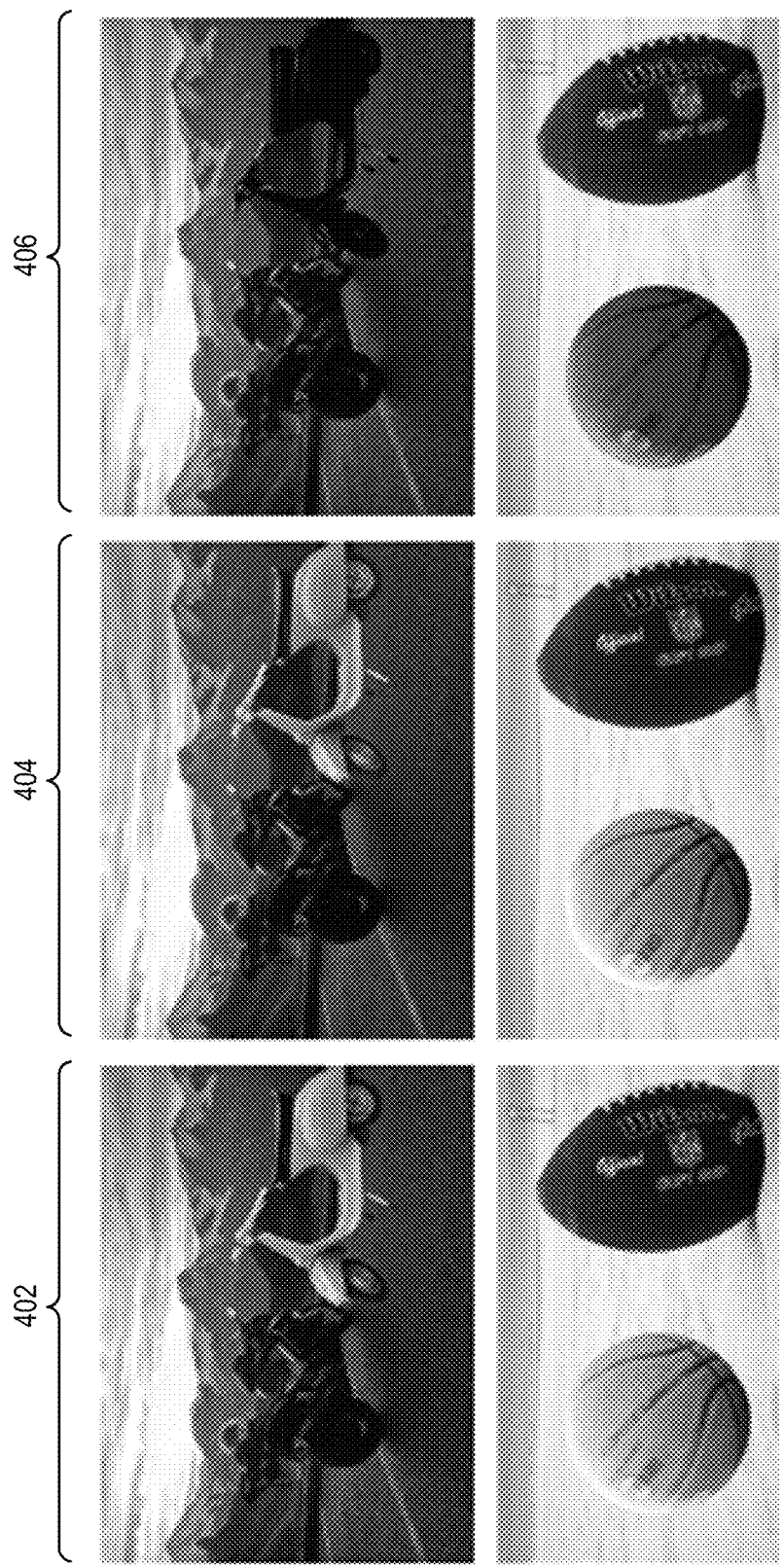
FIG. 4 illustrates an example comparison of composite digital images generated by various systems in accordance with one or more embodiments.

As mentioned, in certain described embodiments, the object harmonization system 102 generates harmonized target objects and/or harmonized digital images. In particular, the object harmonization system 102 utilizes an object-to-object harmonization neural network to generate a harmonized target object that is portrayed with a style corresponding to the style of a reference object. Indeed, the object harmonization system 102 generates more accurate harmonized target objects than conventional digital image editing systems that are capable of compositing digital images. FIG. 4 illustrates a comparison of harmonized target objects (within harmonized digital images) against prior systems in accordance with one or more embodiments.

As illustrated in FIG. 4, the column 402 includes digital images generated by directly compositing a target object into a digital image that includes a reference object. Specifically, a prior system generates a composite digital image within the column 402 without modifying or augmenting the style of a target object added to the reference digital image. As shown, the target objects include the scooter of the top image, the basketball of the middle image, and the leftmost tower of the bottom image. With direct compositing, the digital images in the column 402 are not well harmonized. Indeed, the scooter in does not stylistically fit with the motorcycle or any other portion of the top image. Likewise, the basketball does not resemble the style of the football in the bottom image.

As further illustrated in FIG. 4, the column 404 includes digital images generated utilizing background harmonization. In particular, a prior system generates the composite digital images within the column 404 by stylistically harmonizing a target object with the entire background digital image. As shown, the target objects in the column 404 fit better than those of the column 402, but they still lack stylistic cohesion with any reference objects within the various images. For example, the scooter in the top image still does not reflect the style of the motorcycle. Similarly, the basketball does not reflect the lighting conditions of the football.

By contrast, the column 406 in FIG. 4 includes digital images generated by the object harmonization system 102. Indeed, the object harmonization system 102 generates the digital images of the column 406 utilizing a style encoder neural network and an object-to-object harmonization neural network. For example, the object harmonization system 102 extracts a style code from the motorcycle (e.g., the reference object) of the top image and utilizes the style code to modify features of the scooter (e.g., the target object) via an object-to-object harmonization neural network. Thus, the object harmonization system 102 generates a harmonized digital image where the scooter is portrayed with a style that matches or corresponds to the style of the motorcycle. Similarly, as shown in the column 406, the object harmonization system 102 generates the harmonized basketball that resembles the style of the football.

Figure 5:
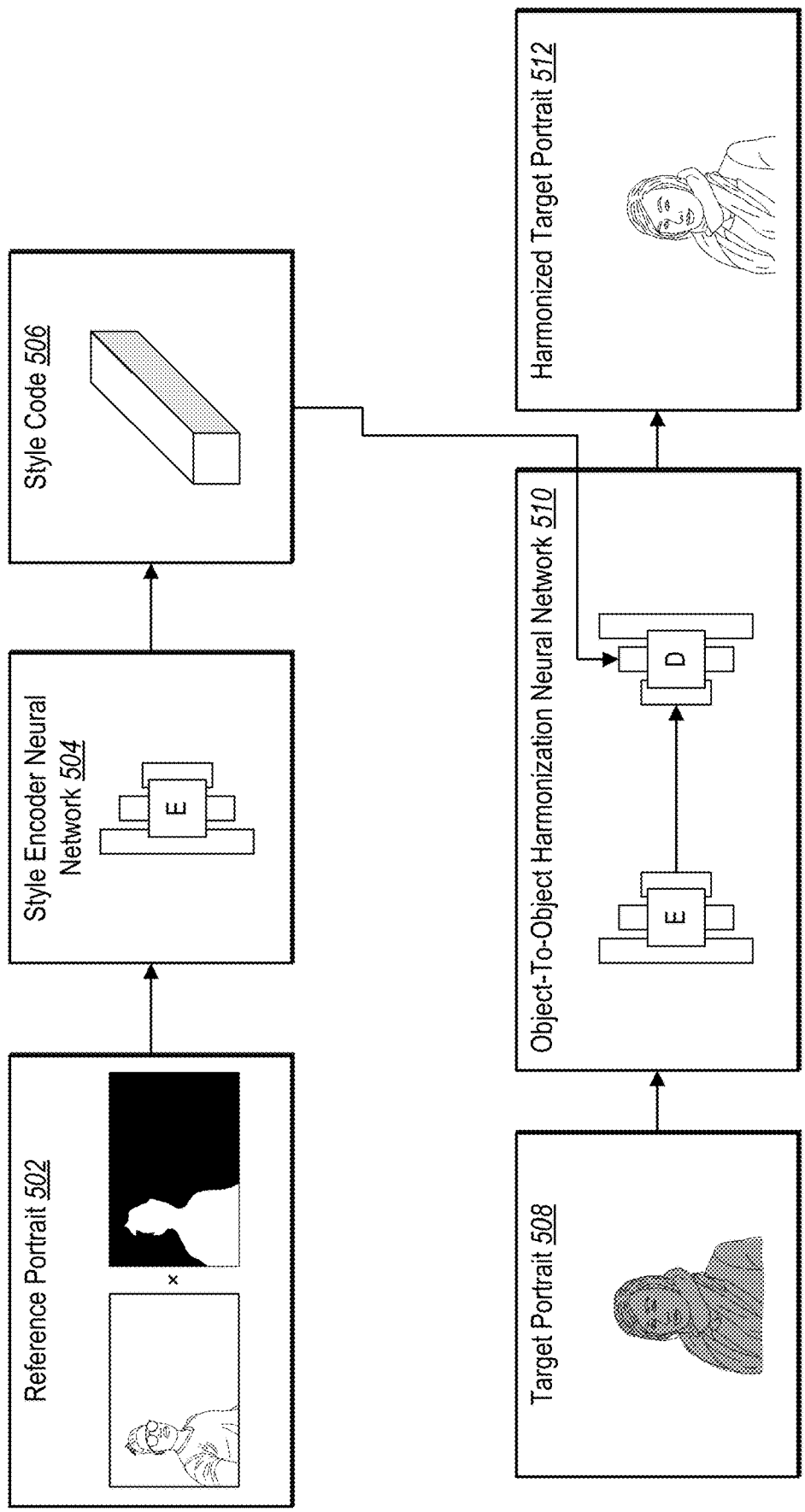
FIG. 5 illustrates an example of generating a harmonized target portrait utilizing the object-to-object harmonization neural network in accordance with one or more embodiments.

As mentioned above, in certain embodiments, the object harmonization system 102 generates harmonized target objects and/or harmonized digital images for a special case called portrait-to-portrait harmonization. In particular, the object harmonization system 102 generates a harmonized target portrait to resemble a style of a reference portrait. FIG. 5 illustrates an example process for generating a harmonized target portrait in accordance with one or more embodiments.

As illustrated in FIG. 5, the object harmonization system 102 accesses or identifies a reference portrait 502. For example, the object harmonization system 102 receives a user interaction selecting the reference portrait 502 from a digital image. Similar to the above description, in some cases, the object harmonization system 102 receives a user interaction selecting the reference portrait 502 by outlining or lassoing the pixels of the reference portrait 502 within a digital image. In turn, the object harmonization system 102 further masks the pixels not depicting the reference portrait 502 (as indicated by the black pixels of the binary mask), considering only unmasked pixels as part of the reference portrait 502. As shown, the reference portrait 502 depicts a man with sunglasses taking a selfie.

As further illustrated in FIG. 5, the object harmonization system 102 utilizes a style encoder neural network 504 (e.g., the style encoder neural network 304) to analyze or process the reference portrait 502. Specifically, the object harmonization system 102 utilizes the style encoder neural network 504 to extract or encode a style code 506 from the reference portrait 502. Indeed, the object harmonization system 102 utilizes the style encoder neural network 504 to generate the style code 506 that includes features representing a style or an appearance of the reference portrait 502, including a color, a saturation, a brightness, and/or a hue.

Additionally, the object harmonization system 102 accesses or receives a target portrait 508. More particularly, the object harmonization system 102 receives a user interaction (e.g., from the client device 108) indicating the target portrait 508. For instance, the object harmonization system 102 receives a user interaction selecting or outlining the target portrait 508 from a digital image or else uploading the target portrait 508 from the client device 108. As shown, the target portrait 508 depicts the face and upper torso of a woman wearing a jacket and scarf.

As further illustrated in FIG. 5, the object harmonization system 102 utilizes an object-to-object harmonization neural network 510 (e.g., the object-to-object harmonization neural network 310) to analyze or process the target portrait 508. To elaborate, the object harmonization system 102 utilizes one or encoder layers of the object-to-object harmonization neural network 510 to extract a set of latent features from the pixels of the target portrait 508. In addition, the object harmonization system 102 utilizes one or more decoder layers of the object-to-object harmonization neural network 510 to augment the extracted features and generate a harmonized target portrait 512. For instance, the object harmonization system 102 passes the style code 506 of the reference portrait 502 to one or more adaptive instance norm layers from among the decoder layers that are used to decode the features of the target portrait 508. Thus, by utilizing the adaptive instance norm layers to apply the style code 506, the object harmonization system 102 generates the harmonized target portrait 512 from the features extracted from the target portrait 508. As shown, the harmonized target portrait 512 depicts the woman of the target portrait 508 but with the style or appearance of the reference portrait 502.

Figure 6:
FIG. 6 illustrates example composite digital image generate by various systems in accordance with one or more embodiments.

As just mentioned, in one or more embodiments, the object harmonization system 102 generates a harmonized target portrait (e.g., the harmonized target portrait 512) or a harmonized digital image that includes one or more harmonized target portraits. In particular, the object harmonization system 102 generates harmonized target portraits that more accurately resemble reference portraits as compared to those generated by conventional digital image editing systems. FIG. 6 illustrates a comparison of harmonized digital images including harmonized target portraits as generated by conventional systems and by the object harmonization system 102 in accordance with one or more embodiments.

As illustrated in FIG. 6, the column 602 includes digital images generated by conventional direct compositing. For example, a conventional system generates a digital image in the column 602 by simply adding or copying the pixels of a target portrait into a digital image, irrespective of a style or appearance of the digital image (or a reference object within the digital image). As shown, the digital images in the column 602 include one portrait that is part of the initial digital image and another portrait (e.g., a target portrait) that is added to the digital image. For instance, the topmost digital image depicts a girl on the left that is part of the initial digital image and a girl on the right that has been added.

However, the style of the girl on the right does not match or harmonize with the rest of the digital image, much less with the specific pixels of the girl on the left. Likewise for the other digital images of the column 602, each depicts a portrait that appears out of place with the image, and especially out of place in relation to the other portrait in the same image.

As also illustrated in FIG. 6, the column 604 includes digital images generated by background harmonization. For example, a conventional system utilizes a background harmonization technique to harmonize a target portrait with pixels of an entire background digital image. In some cases, the digital images of the column 604 are an improvement over those in the column 602, but the images nevertheless depict portraits that appear out of place. For instance, in the topmost digital image, the girl to the right still does not resemble the style of the girl to the left (even though she may resemble the style of the background pixels considered as a whole). Similarly, the other digital images within the column 604 depict portraits that clash with respect to the reference portraits depicted in the images. Indeed, the lighting conditions of the boy in the bottommost image do not resemble the lighting conditions of the girl wearing glasses.

As further illustrated in FIG. 6, the column 606 includes digital images generated by the object harmonization system 102. More specifically, the object harmonization system 102 generates the digital images in the column 606 by extracting style codes from reference portraits and applying the style codes to target portraits added to the digital images utilizing an object-to-object harmonization neural network. For example, the object harmonization system 102 generates the harmonized target portrait of the girl to the right within the topmost image, where the style of the girl resembles the style of the girl to the left. As another example, the object harmonization system 102 generates the harmonized target portrait of the boy (e.g., the target portrait) in the bottommost image to reflect the style of the girl wearing glasses (e.g., the reference portrait).

Figure 7A:
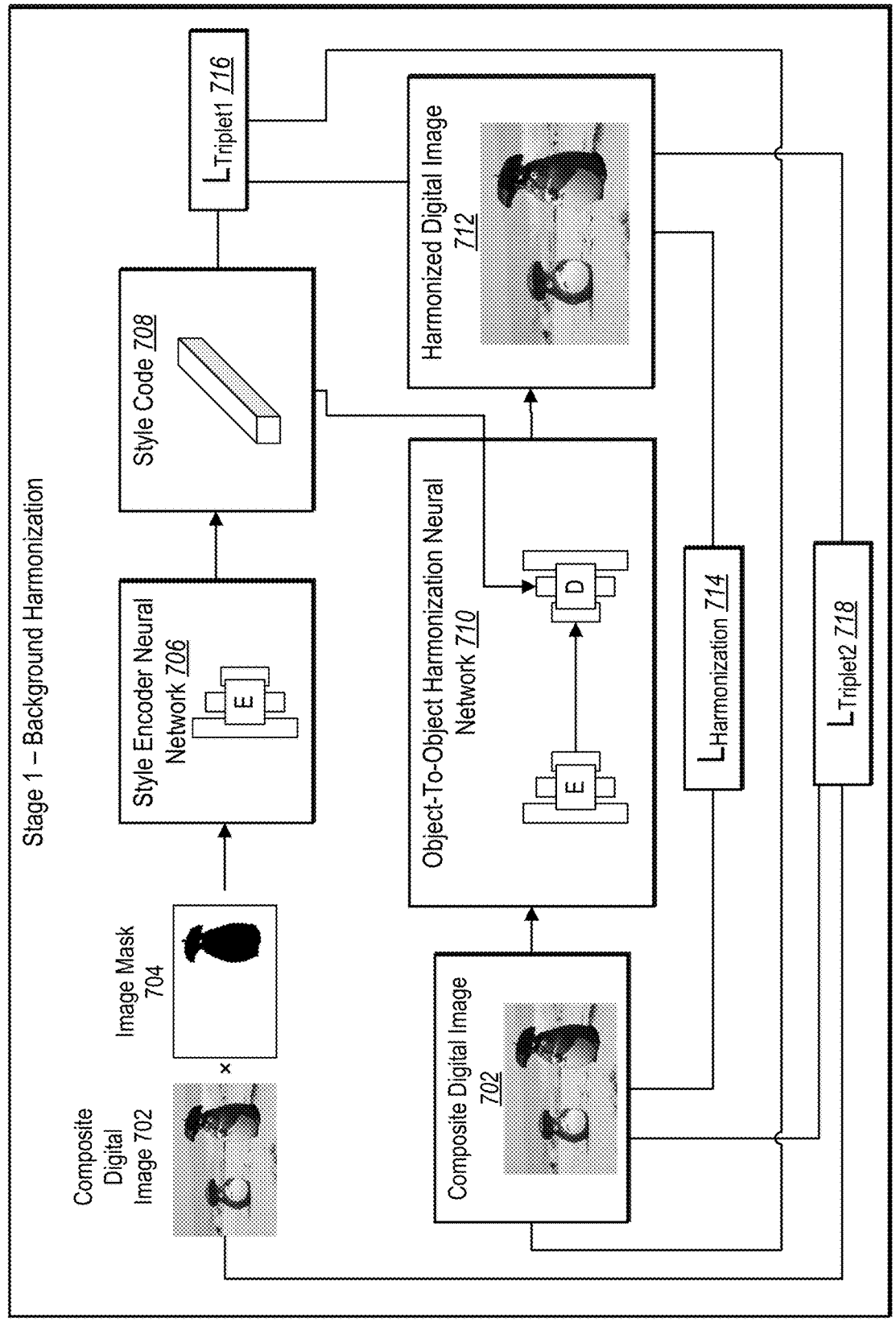
FIGS. 7A-7C illustrate an example multi-stage training process for learning parameters of an object-to-object harmonization neural network in accordance with one or more embodiments.
Figure 7B:
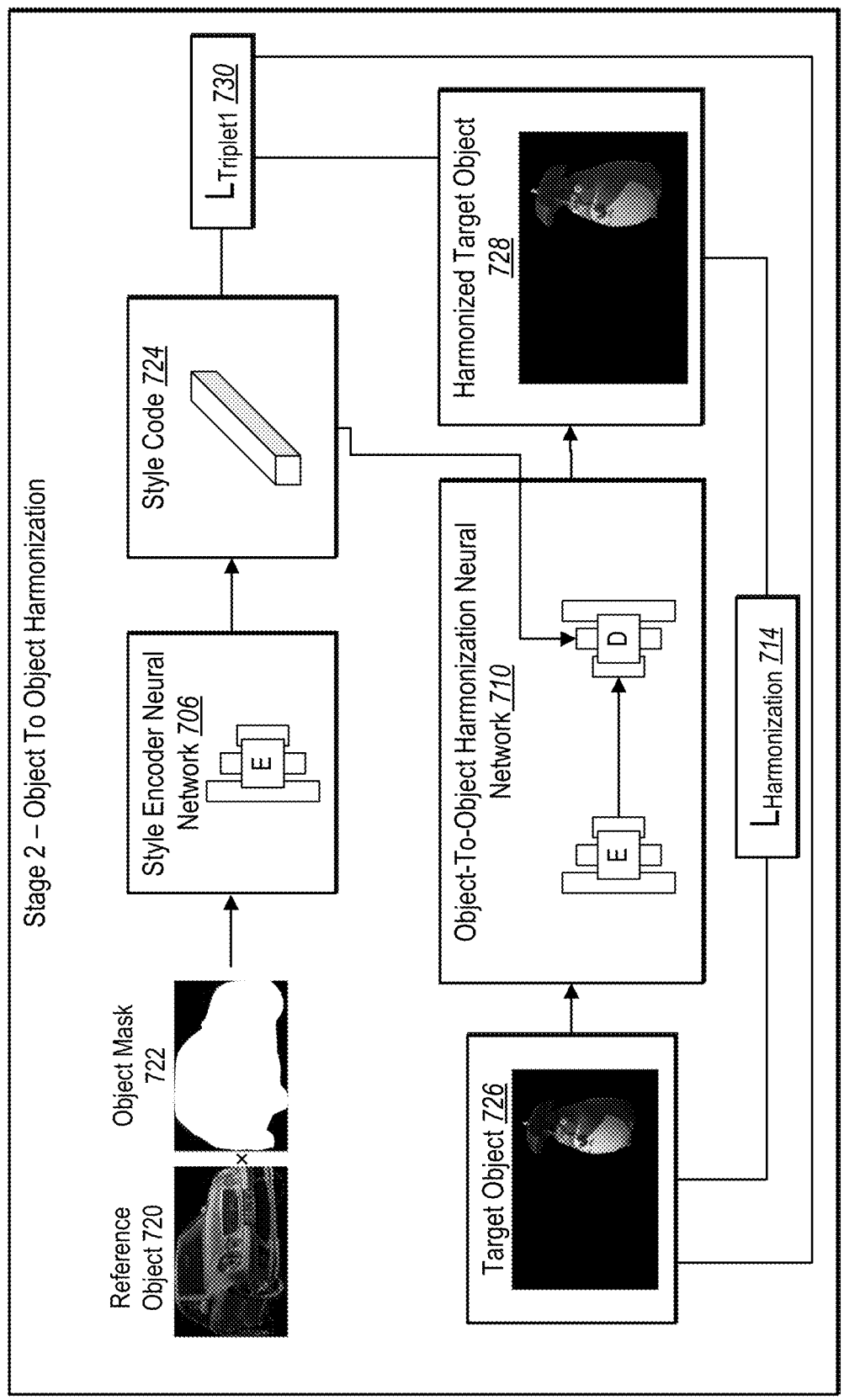
Figure 7C:
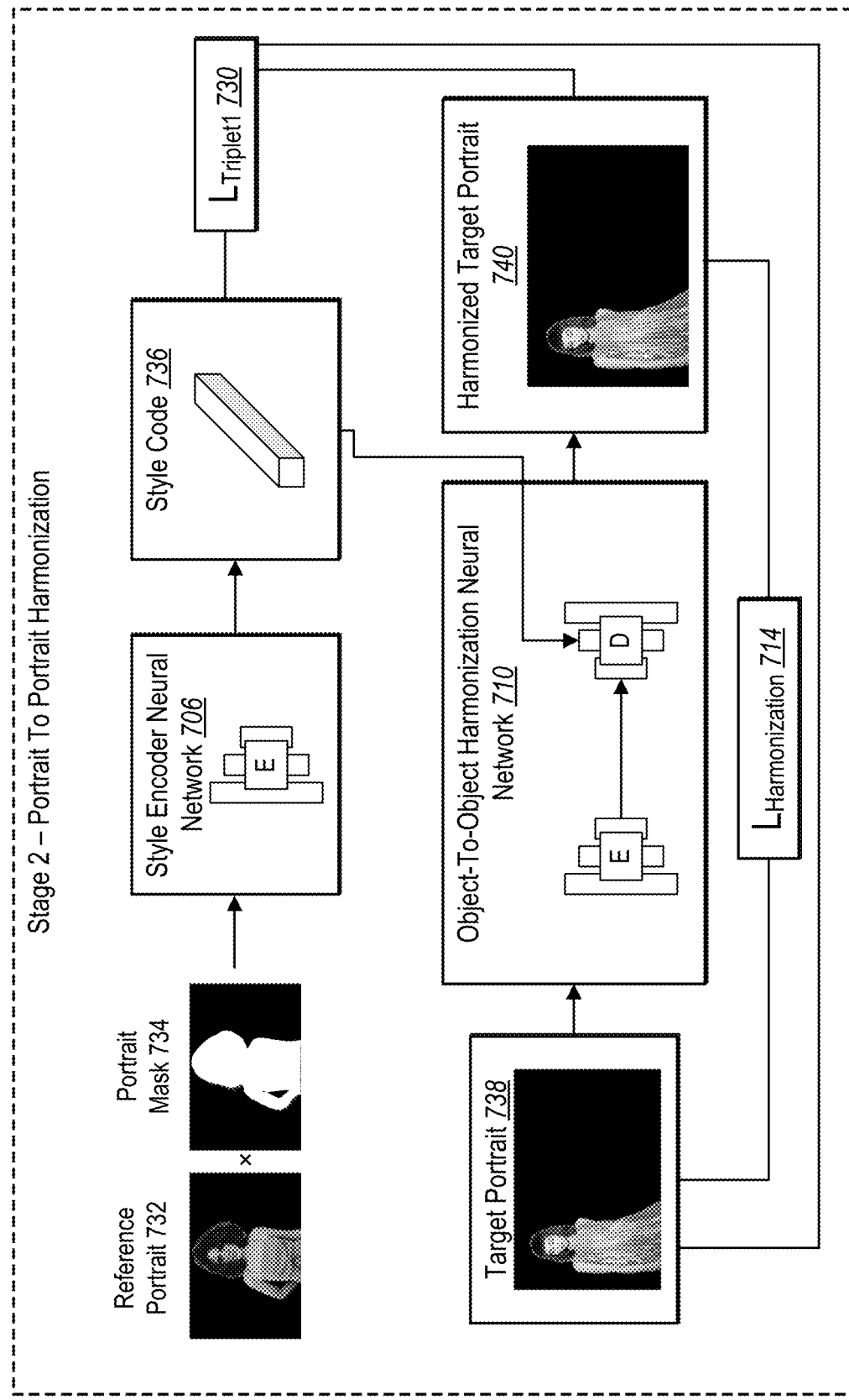

As mentioned above, in certain embodiments, the object harmonization system 102 learns parameters for an object-to-object harmonization neural network. In particular, the object harmonization system 102 utilizes a multi-stage training or tuning process to learn parameters for an object harmonization system (e.g., the object-to-object harmonization neural network 310 or 510). By utilizing the described multi-stage training process with unique losses, the object harmonization system 102 improves the accuracy and precision of the object-to-object harmonization neural network to generate harmonized target objects based on pixels specific to reference object. FIGS. 7A-7C illustrate a multi-stage training process for an object-to-object harmonization neural network in accordance with one or more embodiments. Specifically, FIG. 7A illustrates a first training stage for background harmonization while FIG. 7B illustrates a second training stage for object-to-object harmonization, and FIG. 7C illustrates another second training stage for portrait-to-portrait harmonization. In some embodiments, the object harmonization system 102 performs the second stage of the training (e.g., as described in relation to FIGS. 7B and 7C) without necessarily performing the first stage (e.g., as described in relation to FIG. 7A).

As illustrated in FIG. 7A, the object harmonization system 102 performs a first training stage for background harmonization. More specifically, the object harmonization system 102 performs background harmonization training to learn general parameters for the object-to-object harmonization neural network 710 (e.g., the object-to-object harmonization neural network 310 or 510). For the first stage, the object harmonization system 102 accesses sample composite digital images from a particular dataset (e.g., within the database 112), such as the iHarmony4 dataset and/or the Adobe Panoptic dataset. In some cases, the object harmonization system 102 utilizes the instance segmentation masks provided in these datasets to select (random) objects or portraits as foreground pixels within the digital images.

As shown, the object harmonization system 102 feeds forward the background pixels of the composite digital image 702 into the style encoder neural network 706. Indeed, the object harmonization system 102 applies an image mask 704 to the composite digital image 702 to mask out foreground pixels (or non-background pixels), such as pixels depicting a foreground object within the composite digital image 702 (e.g., the toy on the right side of the composite digital image 702). In turn, the style encoder neural network 706 extracts or generates a style code 708 from the (unmasked) background pixels of the composite digital image 702. Thus, the style code 708 is a background style code that represents a style of the background of the composite digital image 702.

As further shown, the object harmonization system 102 feeds forward the composite digital image 702 into the object-to-object harmonization neural network 710. In some cases, the object harmonization system 102 augments the foreground object or foreground pixels of the composite digital image 702 (to have a different style) before feeding into the object-to-object harmonization neural network 710. In turn, the object-to-object harmonization neural network 710 generates a predicted harmonized digital image 712 from the (augmented version of the) composite digital image 702. Specifically, the object harmonization system 102 generates the predicted harmonized digital image 712 by applying the style code 708 to (features extracted from) the composite digital image 702.

In addition, the object harmonization system 102 compares the predicted harmonized digital image 712 with the composite digital image 702. In some cases, the object harmonization system 102 compares the predicted harmonized digital image 712 not only with the composite digital image 702 but also (or alternatively) with the style code 708, the (unmasked) background portion of the composite digital image 702, and/or the (masked) foreground portion of the composite digital image 702. For instance, the object harmonization system 102 generates or extracts style codes (e.g., utilizing the style encoder neural network 706) from the predicted harmonized digital image 712, from the composite digital image 702, from the background pixels of the composite digital image 702, and/or from the foreground pixels of the composite digital image 702.

Additionally, the object harmonization system 102 utilizes one or more loss functions to compare images and/or style codes and to determine an overall measure of loss associated with the object-to-object harmonization neural network 710. For example, the object harmonization system 102 determines a harmonization loss 714 by comparing the harmonized digital image 712 with the composite digital image 702. In some cases, the object harmonization system 102 determines the harmonization loss 714 in the form of an L1 loss according to:

$$L_{harmonization} = \|H - I\|_1$$

where $L_{harmonization}$ represents the harmonization loss 714, H represents the predicted harmonized digital image 712, and I represents the input or the composite digital image 702. By utilizing the harmonization loss 714, the object harmonization system 102 reduces or minimizes the distances between the predicted harmonized digital image 712 and the input composited digital image 702. This helps the object harmonization system 102 maintain consistent appearance between predictions and ground truth.

In one or more embodiments, the object harmonization system 102 utilizes one or more triplet losses. In particular, the object harmonization system 102 determines triplet losses by comparing various style codes. For example, the object harmonization system 102 determines a first triplet loss 716 by comparing the style code of the harmonized foreground or the harmonized digital image 712 with the style code of background pixels of the composite digital image 702 (e.g., the style code 708) and the style code of the composite digital image 702. In some cases, the object harmonization system 102 determines a first triplet loss 716 according to:

$$L_{triplet1} = \max(\|h,b\|_2 - \|h,c\|_2 + m, 0)$$

where $L_{triplet1}$ represents the first triplet loss 716, h represents the style code of the harmonized foreground or the harmonized digital image 712, b represents the style code of the style code of the background pixels of the composite digital image 702 (e.g., the style code 708), c represents the style code of the composite digital image 702, and m represents a margin. By utilizing the first triplet loss 716, the object harmonization system 102 moves the style code for the harmonized foreground or the harmonized digital image 712 (h) closer to the style code of the background pixels of the composite digital image 702 (b) and farther from the style code of the composite digital image 702 (c).

In certain embodiments, the object harmonization system 102 also (or alternatively) determines a second triplet loss 718. In some cases, the object harmonization system 102 determines the second triplet loss 718 by comparing the style code of the harmonized digital image 712 with the style code of an augmented version of the composite digital image 702 (e.g., as input into the object-to-object harmonization neural network 710) and the style code of a non-augmented version of the composite digital image 702 (e.g., as input into the style encoder neural network 706). For instance, the object harmonization system 102 determines the second triplet loss 718 according to:

$$L_{triplet2} = \max(\|h,r\|_2 - \|h,c\|_2 + m, 0)$$

where $L_{triplet2}$ represents the second triplet loss 718, r represents the style code of the non-augmented version of the composite digital image 702, h represents the style code of the harmonized digital image 712, c represents the style code of the augmented version of the composite digital image 702, and m represents a margin. By utilizing the second triplet loss 718, the object harmonization system 102 moves the style code of the harmonized digital image 712 (h) closer to the style code of the non-augmented version of the composite digital image 702 (e.g., the real foreground r) and farther from the style code of the augmented version of the composite digital image 702 (c).

In one or more embodiments, the object harmonization system 102 combines the harmonization loss 714, the first triplet loss 716, and the second triplet loss 718 into a combined loss function. Indeed, the object harmonization system 102 determines an overall loss or a combined loss according to:

$$L_{stage1} = L_{harmonization} + \lambda(L_{triplet1} + L_{triplet2})$$

where $L_{stage1}$ represents the overall loss for background harmonization of stage one and where λ represents a weight or a contribution factor for controlling an amount or measure of contribution of the triplet losses 716 and 718 with respect to the overall stage one loss (e.g., relative to the harmonization loss 714).

In some embodiments, the object harmonization system 102 modifies parameters of the object-to-object harmonization neural network 710 based on one or more of the aforementioned losses for stage one. For example, the object harmonization system 102 modifies internal weights and/or biases associated with various layers and neurons of the object-to-object harmonization neural network 710 to reduce the overall stage one loss (e.g., by reducing the harmonization loss 714, the first triplet loss 716, and/or the second triplet loss 718). Modifying the parameters to reduce loss in this way improves the accuracy of the object-to-object harmonization neural network 710.

In some cases, the object harmonization system 102 further repeats the process illustrated in FIG. 7A for a number of iterations and/or until the object-to-object harmonization neural network 710 satisfies a threshold measure of loss for the overall stage one loss (and/or for one or more of the constituent losses). Indeed, the object harmonization system 102 repeats the process to generate a new predicted harmonized digital image (e.g., from a new composite digital image from a sample dataset), to redetermine the overall stage one loss with the newly modified parameters of the object-to-object harmonization neural network 710, and to modify the parameters of the object-to-object harmonization neural network 710 reduce the measure of loss.

As mentioned, the object harmonization system 102 performs a second training stage to refine or update parameters of the object-to-object harmonization neural network 710 for object-to-object harmonization. In particular, the object harmonization system 102 refines the parameters learned via the background harmonization of stage one by implementing a training process specific to individual objects. FIG. 7B illustrates refining parameters via object-to-object harmonization in accordance with one or more embodiments.

As illustrated in FIG. 7B, the object harmonization system 102 feeds a reference object 720 into the style encoder neural network 706. More specifically, the object harmonization system 102 feeds pixels of a reference image that depict a reference object into the style encoder neural network 706 by applying an object mask 722. Indeed, the object harmonization system 102 applies the object mask 722 to mask pixels not depicting the reference object 720 (e.g., the car). In turn, the style encoder neural network 706 generates a style code 724 which represents the style of the reference object 720. In some cases, the object harmonization system 102 randomly selects a reference object to mask from a digital image of a dataset to use as a reference object.

As further illustrated in FIG. 7B, the object harmonization system 102 feeds a target object 726 into the object-to-object harmonization neural network 710. In some cases, the object harmonization system 102 feeds the masked foreground of the composite digital image 702 into the object-to-object harmonization neural network 710. As shown, the target object 726 depicts the masked foreground object from the composite digital image 702 of FIG. 7A. Additionally, the object harmonization system 102 generates the predicted harmonized target object 728 from the target object 726 by applying the style code 724 utilizing the object-to-object harmonization neural network 710. The object harmonization system 102 further determines one or more measures of loss associated with the predicted harmonized target object 728.

In one or more embodiments, in stage two, the object harmonization system 102 reuses the harmonization loss 714 and the second triplet loss 718 of stage one, as described above in relation to FIG. 7A. In some cases, the object harmonization system 102 determines a harmonization loss 714 by comparing the predicted harmonized target object 728 and the target object 726 input into the object-to-object harmonization neural network 710. The object harmonization system 102 also determines a first triplet loss 730 by comparing the style code of the predicted harmonized target object 728 with the style code of the reference object 720 (e.g., the style code 724) and the style code of the target object 726. For instance, the object harmonization system 102 determines the first triplet loss 730 according to:

$$L_{triplet1} = \max(\|h, \text{ref}\|_2 - \|h, c\|_2 + m, 0)$$

where $L_{triplet1}$ represents the first triplet loss 730, ref represents the style code of the reference object 720 (e.g., the style code 724), h represents the style code of the predicted harmonized target object 728, c represents the style code of the target object 726, and m is a margin value. By utilizing the first triplet loss 730, the object harmonization system 102 moves the style code of the predicted harmonized target object 728 ($h$) closer to the style code of the reference object 720 (ref) and farther from the style code of the target object 726 ($c$).

In certain embodiments, the object harmonization system 102 determines one or more additional losses for the second stage of the training process. For example, the object harmonization system 102 determines and utilizes additional L1 losses such as a highlight loss, a mid-tone loss, and a shadow loss. In some cases, the object harmonization system 102 determines the highlight loss, the mid-tone loss, and/or the shadow loss between a highest, a mean, and a lowest luminescence point within the predicted harmonized target object 728, respectively. For instance, the object harmonization system 102 determines a highlight loss, a mid-tone loss, and a shadow loss as follows:

$$L_{highlight} = \|H_p - I_p\|_1$$

$$L_{mid-tone} = \|H_q - I_q\|_1$$

$$L_{shadow} = \|H_r - I_r\|_1$$

where $L_{highlight}$ represents a highlight loss, $L_{mid-tone}$ represents a mid-tone loss, $L_{shadow}$ represents a shadow loss, H represents the predicted harmonized target object 728, I represents the input target object 726, and where:

$$p = i(\max(L(H)))$$

$$q = i(\text{mean}(L(H)))$$

$$r = i(\min(L(H)))$$

where L represents the luminescence channel of a digital image and i represents the index location.

In one or more embodiments, the object harmonization system 102 determines and utilizes a contrast loss that is a combination of the highlight loss, the mid-tone loss, and/or the shadow loss. Specifically, in some cases, the contrast loss is defined as:

$$L_{contrast} = L_{highlight} + L_{mid-tone} + L_{shadow}$$

where $L_{contrast}$ represents the contrast loss and the other terms are defined above. By utilizing the contrast loss, the object harmonization system 102 more accurately matches the lighting conditions of the harmonized target object 728 with that of the reference object 720 by considering contrast factors for different levels of luminescence (e.g., the highlight loss, the mid-tone loss, and the shadow loss) not accounted for in conventional systems.

In one or more implementations, the object harmonization system 102 determines an overall loss for stage two of training process. For instance, the object harmonization system 102 determines an overall stage two loss as a combination of the contrast loss, the harmonization loss 714, and/or one or more of the first triplet loss 730 and the second triplet loss 718. In some cases, the object harmonization system 102 determines the overall stage two loss according to:

$$L_{stage2} = L_{harmonization} + \alpha L_{triplet} + \beta L_{contrast}$$

where $L_{stage2}$ represents the overall stage two loss, $L_{harmonization}$ represents the harmonization loss 714, $L_{triplet}$ represents one or more of the first triplet loss 730 or the second triplet loss 718 (e.g., $L_{triplet1} + L_{triplet2}$), $L_{contrast}$ represents the contrast loss, and where $\alpha$ and $\beta$ are weights or contribution factors for controlling the impact or effect of the triplet loss and the contrast loss on the overall stage two loss.

In some embodiments, the object harmonization system 102 updates or modifies internal parameters of the object-to-object harmonization neural network 710 based on one or more of the aforementioned losses. For example, the object harmonization system 102 determines the overall stage two loss and updates internal weights and biases for various layers and neurons of the object-to-object harmonization neural network 710 to reduce the measure of loss. In some cases, the object harmonization system 102 reduces the contrast loss, the harmonization loss, and/or the triplet loss by modifying the parameters of the object-to-object harmonization neural network 710.

Additionally, the object harmonization system 102 repeats the process illustrated in FIG. 7B for a number of iterations and/or until the object-to-object harmonization neural network 710 satisfies a threshold measure of loss (e.g., a threshold measure of overall stage two loss). Indeed, the object harmonization system 102 accesses new reference objects and/or new target objects to generate new style codes and new harmonized target objects utilizing the modified parameters of the object-to-object harmonization neural network 710. The object harmonization system 102 further determines the overall stage two loss for each new generated harmonized target object and refines the parameters of the object-to-object harmonization neural network 710 to reduce the measure of loss.

As further mentioned above, the object harmonization system 102 performs a second stage to refine or update parameters of the object-to-object harmonization neural network 710 for portrait-to-portrait harmonization. Indeed, for special cases involving digital images depicting portraits of individuals (as opposed to other objects), the object harmonization system 102 refines the parameters of the object-to-object harmonization neural network 710 with a specialized dataset. FIG. 7C illustrates a second stage of a multi-stage training process for refining parameters of an object-to-object harmonization neural network for portrait-to-portrait harmonization in accordance with one or more embodiments.

As illustrated in FIG. 7C, the object harmonization system 102 performs the same steps as described in relation to FIG. 7B. However, rather than utilizing a dataset of digital images depicting various objects, the object harmonization system 102 utilizes a multi-person parsing dataset that instead depicts only portraits. The object harmonization system 102 can augment the portrait images to generate target portraits for harmonizing with reference portraits. For example, the object harmonization system 102 augments a portrait image to generate the target portrait 738 for feeding into the object-to-object harmonization neural network 710.

As further illustrated in FIG. 7C, the object harmonization system 102 accesses a reference portrait 732 from a dataset (e.g., within the database 112). In addition, the object harmonization system 102 masks out background pixels of the reference portrait 732 by applying a portrait mask 734. Thus, the object harmonization system 102 feeds only those pixels of the reference portrait 732 depicting the individual into the style encoder neural network 706. In turn, the style encoder neural network 706 generates a style code 736 representing the style of the reference portrait 732.

In addition, the object harmonization system 102 generates a predicted harmonized target portrait 740 from the target portrait 738 by applying the style code 736 utilizing the object-to-object harmonization neural network 710. The object harmonization system 102 further determines one or more losses associated with the predicted harmonized target portrait 740 and refines the parameters of the object-to-object harmonization neural network 710 to reduce the measure(s) of loss.

In some cases, the object harmonization system 102 utilizes the same overall stage two loss $L_{stage2}$ described above in relation to FIG. 7B. In particular, the object harmonization system 102 determines a harmonization loss, one or more triplet losses, and a contrast loss based on style codes of the reference portrait 732, the target portrait 738, and the predicted harmonized target portrait 740. For example, the object harmonization system 102 determines a harmonization loss by comparing the predicted harmonized target portrait 740 and the target portrait 738. In addition, the object harmonization system 102 determines a triplet loss by comparing a style code of the predicted harmonized target portrait 740 with a style code of the reference portrait (e.g., the style code 736) and a style code of the target portrait 738. The object harmonization system 102 further refines parameters of the object harmonization system 102 to reduce one or more measures of loss (e.g., the overall stage two loss) and repeats the process with new reference portraits and target portraits until the parameters of the object-to-object harmonization neural network 710 generate a harmonized target portrait that satisfies a threshold measure of loss.

Figure 8:
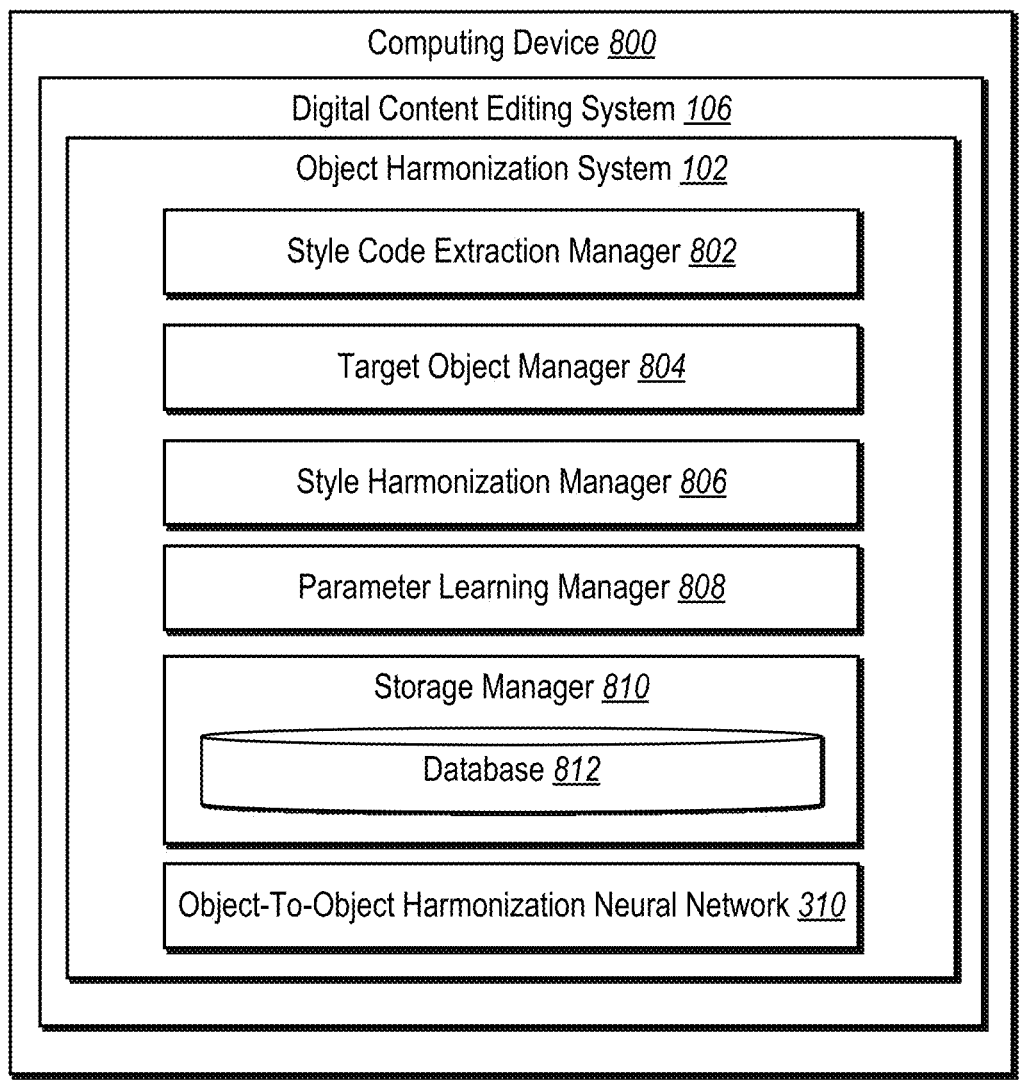
FIG. 8 illustrates a schematic diagram of an object harmonization system in accordance with one or more embodiments.

Looking now to FIG. 8, additional detail will be provided regarding components and capabilities of the object harmonization system 102. Specifically, FIG. 8 illustrates an example schematic diagram of the object harmonization system 102 on an example computing device 800 (e.g., one or more of the client device 108 and/or the server(s) 104). As shown in FIG. 8, the object harmonization system 102 includes a style code extraction manager 802, a target object manager 804, a style harmonization manager 806, a parameter learning manager 808, a storage manager 810, and the object-to-object harmonization neural network 310/510/710.

As just mentioned, the object harmonization system 102 includes a style code extraction manager 802. In particular, the style code extraction manager 802 manages, maintains, extracts, encodes, generates, determines, or identifies one or more style codes. For example, the style code extraction manager 802 extracts a style code from a reference object within a digital image. In some cases, the style code extraction manager 802 also extracts style codes from other objects or images, such as from a composite digital image, an augmented composite digital image, a target object, a harmonized digital image, or a harmonized target object.

As shown, the object harmonization system 102 also includes a target object manager 804. In particular, the target object manager 804 manages, maintains, detects, determines, receives, or identifies a target object. For example, the target object manager 804 determines pixels of a digital image depicting a target object for stylistically harmonizing with a reference object. In some cases, the target object manager 804 determines more than one target object to add to a single digital image, where each target object can be harmonized to a different reference object.

Additionally, the object harmonization system 102 includes a style harmonization manager 806. In particular, the style harmonization manager 806 manages, maintains, determines, harmonizes, matches, or aligns styles between objects. For example, the style harmonization manager 806 stylistically harmonizes a target object to depict a style of a reference object by utilizing an object-to-object harmonization neural network 310/510/710. In some cases, the style harmonization manager 806 harmonizes styles by applying a style code extracted from a reference object to features extracted from a target object utilizing the object-to-object harmonization neural network 310/510/710.

As further illustrated in FIG. 8, the object harmonization system 102 includes a parameter learning manager 808. In particular, the parameter learning manager 808 manages, maintains, learns, determines, generates, modifies, updates, or refines parameters of one or more neural networks. For example, the parameter learning manager 808 learns parameters for an object-to-object harmonization neural network 310/510/710 utilizing a multi-stage training process. Indeed, the parameter learning manager 808 utilizes a first stage to learn general parameters based on background harmonization and utilizes a second stage to refine the parameters based on object-to-object harmonization (or portrait-to-portrait harmonization).

The object harmonization system 102 further includes a storage manager 810. The storage manager 810 operates in conjunction with or include one or more memory devices such as the database 812 (e.g., the database 112) that store various data such as digital images (including sample image datasets for training), a style encoder neural network, and an object-to-object harmonization neural network 310/510/710. The storage manager 810 (e.g., via a non-transitory computer memory/one or more memory devices) stores and maintains data associated with stylistically harmonizing target objects with reference objects, including information defining the target objects, the reference objects, and extracted style codes.

In one or more embodiments, each of the components of the object harmonization system 102 are in communication with one another using any suitable communication technologies. Additionally, the components of the object harmonization system 102 is in communication with one or more other devices including one or more client devices described above. It will be recognized that although the components of the object harmonization system 102 are shown to be separate in FIG. 8, any of the subcomponents may be combined into fewer components, such as into a single component, or divided into more components as may serve a particular implementation. Furthermore, although the components of FIG. 8 are described in connection with the object harmonization system 102, at least some of the components for performing operations in conjunction with the object harmonization system 102 described herein may be implemented on other devices within the environment.

The components of the object harmonization system 102 can include software, hardware, or both. For example, the components of the object harmonization system 102 can include one or more instructions stored on a computer-readable storage medium and executable by processors of one or more computing devices (e.g., the computing device 800). When executed by the one or more processors, the computer-executable instructions of the object harmonization system 102 can cause the computing device 800 to perform the methods described herein. Alternatively, the components of the object harmonization system 102 can comprise hardware, such as a special purpose processing device to perform a certain function or group of functions. Additionally, or alternatively, the components of the object harmonization system 102 can include a combination of computer-executable instructions and hardware.

Furthermore, the components of the object harmonization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the object harmonization system 102 may be implemented as part of a stand-alone application on a personal computing device or a mobile device. Alternatively, or additionally, the components of the object harmonization system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, LIGHTROOM®, and INDESIGN®. "ADOBE," "ADOBE EXPERIENCE MANAGER," "CREATIVE CLOUD," "ADOBE STOCK," "PHOTOSHOP," "LIGHTROOM," and "INDESIGN" are either registered trademarks or trademarks of Adobe Inc. in the United States and/or other countries.

FIGS. 1-8 the corresponding text, and the examples provide a number of different systems, methods, and non-transitory computer readable media for generating a harmonized target object by applying an extracted style code from a reference object utilizing an object-to-object harmonization neural network. In addition to the foregoing, embodiments can also be described in terms of flowcharts comprising acts for accomplishing a particular result. For example, FIG. 9 illustrates flowcharts of example sequences or series of acts in accordance with one or more embodiments.

Figure 9:
FIG. 9 illustrates a flowchart of a series of acts for generating harmonized target objects utilizing an object-to-object harmonization neural network in accordance with one or more embodiments.
Figure 9:

While FIG. 9 illustrates acts according to various embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 of generating a harmonized target object by applying an extracted style code from a reference object utilizing an object-to-object harmonization neural network. In particular, the series of acts 900 includes an act 902 of extracting a style code from a reference object. For example, the act 902 involves extracting a style code from a reference object depicted within a digital image utilizing a style encoder neural network. In some embodiments, the series of acts 900 includes an act of isolating the reference object from the digital image by masking pixels of the digital image not depicting the reference object. In certain cases, the act 902 involves extracting the style code comprising latent features representing one or more of a color, a saturation, a brightness, or a hue of the reference object.

As shown, the series of acts 900 also includes an act 904 of determining a target object to harmonize. In particular, the act 904 involves determining, for inclusion within the digital image, a target object to harmonize stylistically with the reference object.

As further illustrated in FIG. 9, the series of acts 900 includes an act 906 of generating a harmonized target object from the style code. In particular, the act 906 involves generating a harmonized target object depicted in a style corresponding to the style code of the reference object by utilizing an object-to-object harmonization neural network to apply the style code of the reference object to the target object. For example, the act 906 involves extracting features from the target object utilizing encoder layers of the object-to-object harmonization neural network. In some cases, the act 906 also involves generating modified features from the features of the target object by applying the style code utilizing one or more decoder layers of the object-to-object harmonization neural network and decoding the modified features to generate the harmonized target object. In some cases, the act 906 involves generating, by applying the style code of the reference object to the target object utilizing an object-to-object harmonization neural network, a harmonized digital image comprising a modified target object depicted in a style corresponding to the style code of the reference object.

In certain embodiments, the act 906 involves generating the modified features by applying the style code to the features of the target object utilizing adaptive instance norm layers between residual blocks of a decoder neural network that is part of the object-to-object harmonization neural network. In some cases, the series of acts 900 involves generating a harmonized digital image depicting the harmonized target object and the reference object harmonized together stylistically. In one or more implementations, the series of acts 900 includes an act of providing the harmonized target object for display on a client device. Providing the harmonized target object for display on the client device can include providing the harmonized target object for display within a harmonized digital image depicting the harmonized target object together with the reference object.

In one or more embodiments, the series of acts 900 includes an act of receiving a first user interaction indicating the reference object within the digital image and an act of receiving a second user interaction selecting the target object to include within the digital image. For example, determining the target object can include receiving a user interaction selecting the target object to add to the digital image.

In some cases, the series of acts 900 includes an act to learn parameters of the object-to-object harmonization neural network. Learning the parameters can include extracting a background style code from background pixels of a digital image utilizing the style encoder neural network, generating a predicted background harmonization digital image by applying the background style code to the digital image utilizing the object-to-object harmonization neural network, and modifying the parameters of the object-to-object harmonization neural network according to a comparison of the predicted background harmonization digital image with the digital image.

In addition, learning the parameters can include comparing the predicted background harmonization digital image with the digital image to determine a measure of loss associated with the object-to-object harmonization neural network. In some cases, learning the parameters can include modifying the parameters of the object-to-object harmonization neural network to reduce the measure of loss.

Learning the parameters can also include refining the parameters of the object-to-object harmonization neural network. Refining the parameters can include extracting an object style code from a sample reference object utilizing the style encoder neural network, generating a predicted harmonized target object by applying the object style code to a sample target object utilizing the parameters of the object-to-object harmonization neural network, and refining the parameters of the object-to-object harmonization neural network according to a comparison of the predicted object harmonization digital image with the sample reference object.

In some cases, learning the parameters includes comparing the predicted object harmonization digital image with the sample reference object to determine a measure of loss associated with the object-to-object harmonization neural network. In these or other cases, learning the parameters includes refining the parameters of the object-to-object harmonization neural network to reduce the measure of loss. Determining the measure of loss can include combining a harmonization loss, a triplet loss, and a contrast loss. In addition, determining the contrast loss can include combining a highlight loss, a mid-tone loss, and a shadow loss. As mentioned, the series of acts 900 can include an act of refining the parameters of the object-to-object harmonization neural network learned from generic background harmonization of the predicted background harmonization digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
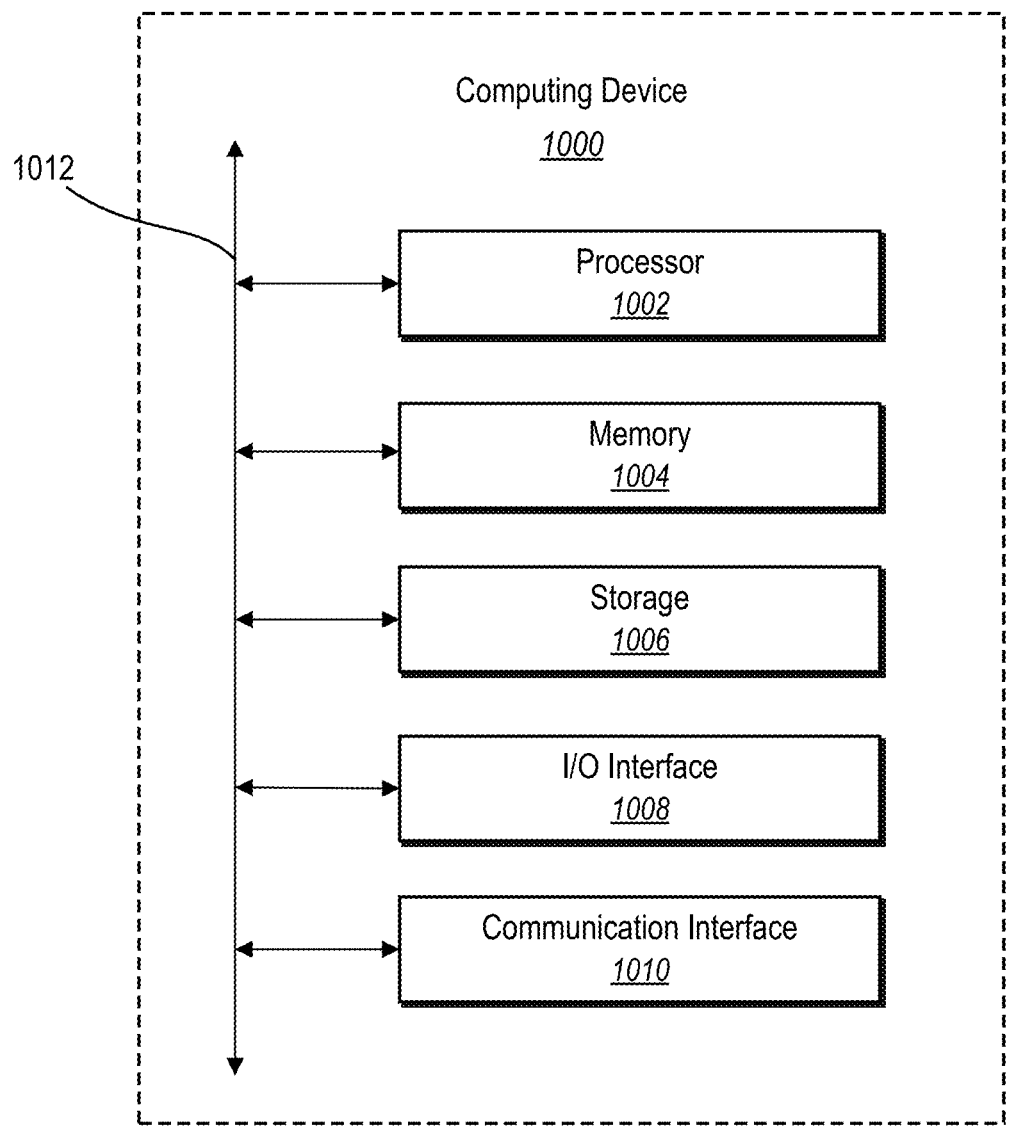
FIG. 10 illustrates a block diagram of an example computing device in accordance with one or more embodiments.

FIG. 10 illustrates, in block diagram form, an example computing device 1000 (e.g., the computing device 800, the client device 108, and/or the server(s) 104) that may be configured to perform one or more of the processes described above. One will appreciate that the object harmonization system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   extract a style code from a reference object depicted within a digital image utilizing a style encoder neural network;
   determine, for inclusion within the digital image, a target object to harmonize stylistically with the reference object; and
   generate a harmonized target object depicted in a style corresponding to the style code of the reference object by utilizing an object-to-object harmonization neural network to apply the style code of the reference object to the target object and to harmonize contrast factors of the digital image by harmonizing one or more of a highlight lighting condition, a tone lighting condition, or a shadow lighting condition of the digital image based on the style code for the target object.

2. The non-transitory computer readable medium of claim 1, further comprising instructions that, when executed by the at least one processor, cause the computing device to isolate the reference object from the digital image by masking pixels of the digital image not depicting the reference object.

3. The non-transitory computer readable medium of claim 1, further comprising instructions that, when executed by the at least one processor, cause the computing device to generate the harmonized target object by:
   extracting features from the target object utilizing encoder layers of the object-to-object harmonization neural network;
   generating modified features from the features of the target object by applying the style code utilizing one or more decoder layers of the object-to-object harmonization neural network; and
   decoding the modified features to generate the harmonized target object.

4. The non-transitory computer readable medium of claim 3, further comprising instructions that, when executed by the at least one processor, cause the computing device to generate the modified features by applying the style code to the features of the target object utilizing adaptive instance norm layers between residual blocks of a decoder neural network that is part of the object-to-object harmonization neural network.

5. The non-transitory computer readable medium of claim 1, further comprising instructions that, when executed by the at least one processor, cause the computing device to generate a harmonized digital image depicting the harmonized target object and the reference object harmonized together stylistically.

6. The non-transitory computer readable medium of claim 1, further comprising instructions that, when executed by the at least one processor, cause the computing device to extract the style code comprising latent features representing one or more of a color, a saturation, a brightness, or a hue of the reference object.

7. The non-transitory computer readable medium of claim 1, further comprising instructions that, when executed by the at least one processor, cause the computing device to:
   receive a first user interaction indicating the reference object within the digital image; and
   receive a second user interaction selecting the target object to include within the digital image.

8. A system comprising:
   one or more memory devices storing a digital image, a style encoder neural network, and an object-to-object harmonization neural network; and
   one or more processors configured to cause the system to:
      isolate a reference object from the digital image by applying a mask to pixels of the digital image not depicting the reference object;
      extract a style code from the reference object utilizing the style encoder neural network, the style code encoding one or more of a color, a saturation, a brightness, or a hue of the reference object;
      determine a target object to stylistically harmonize with the reference object; and
      generate, by applying the style code of the reference object to the target object utilizing the object-to-object harmonization neural network, a harmonized digital image comprising a modified target object depicted in a style corresponding to the style code of the reference object and to harmonize contrast factors of the digital image by harmonizing one or more of a highlight lighting condition, a tone lighting condition, or a shadow lighting condition of the digital image based on the style code for the target object.

9. The system of claim 8, wherein the one or more processors are further configured to cause the system to learn parameters of the object-to-object harmonization neural network by:
   extracting a background style code from background pixels of a digital image utilizing the style encoder neural network;
   generating a predicted background harmonization digital image by applying the background style code to the digital image utilizing the object-to-object harmonization neural network; and
   modifying the parameters of the object-to-object harmonization neural network according to a comparison of the predicted background harmonization digital image with the digital image.

10. The system of claim 9, wherein the one or more processors are further configured to cause the system to:
   compare the predicted background harmonization digital image with the digital image to determine a measure of loss associated with the object-to-object harmonization neural network; and
   modify the parameters of the object-to-object harmonization neural network to reduce the measure of loss.

11. The system of claim 9, wherein the one or more processors are further configured to cause the system to refine the parameters of the object-to-object harmonization neural network by:
   extracting an object style code from a sample reference object utilizing the style encoder neural network;
   generating a predicted harmonized target object by applying the object style code to a sample target object utilizing the parameters of the object-to-object harmonization neural network; and
   refining the parameters of the object-to-object harmonization neural network according to a comparison of the predicted harmonized target object with the sample reference object.

12. The system of claim 11, wherein the one or more processors are further configured to cause the system to:
   compare the predicted harmonized target object with the sample reference object to determine a measure of loss associated with the object-to-object harmonization neural network; and
   refine the parameters of the object-to-object harmonization neural network to reduce the measure of loss.

13. The system of claim 12, wherein the one or more processors are further configured to cause the system to determine the measure of loss by combining a harmonization loss, a triplet loss, and a contrast loss comprising a highlight loss, a mid-tone loss, and a shadow loss.

14. The system of claim 8, wherein the one or more processors are further configured to cause the system to generate the modified target object by:
   extracting features from the target object utilizing encoder layers of the object-to-object harmonization neural network;

generating modified features from the features of the target object by applying the style code utilizing one or more decoder layers of the object-to-object harmonization neural network; and decoding the modified features to generate the modified target object.

15. The system of claim 11, wherein the one or more processors are further configured to cause the system to refine the parameters of the object-to-object harmonization neural network learned from generic background harmonization of the predicted background harmonization digital image.

16. A computer-implemented method comprising:

isolating a reference object from a digital image by applying a mask to pixels of the digital image not depicting the reference object;

extracting a style code from a reference object depicted within a digital image utilizing a style encoder neural network;

determining a target object to stylistically harmonize with the reference object;

generating a harmonized target object depicted in a style corresponding to the style code of the reference object by utilizing an object-to-object harmonization neural network to apply the style code of the reference object to the target object and to harmonize contrast factors of the digital image by harmonizing one or more of a highlight lighting condition, a tone lighting condition, or a shadow lighting condition of the digital image based on the style code for the target object; and providing the harmonized target object for display on a client device.

17. The computer-implemented method of claim 16, further comprising receiving a user interaction indicating the reference object within the digital image.

18. The computer-implemented method of claim 16, wherein determining the target object comprises receiving a user interaction selecting the target object to add to the digital image.

19. The computer-implemented method of claim 16, wherein providing the harmonized target object for display on the client device comprises providing the harmonized target object for display within a harmonized digital image depicting the harmonized target object together with the reference object.

20. The computer-implemented method of claim 16, wherein determining the target object to stylistically harmonized with the reference object comprises determining the target object comprising one or more of a color, a saturation, a brightness, or a hue to harmonize with the reference object.

* * * * *